(12) United States Patent
Oshiumi et al.

(10) Patent No.: US 11,390,759 B2
(45) Date of Patent: Jul. 19, 2022

(54) SURFACE PROTECTION COMPOSITION AND TERMINAL FITTED ELECTRIC WIRE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); KYUSHU UNIVERSITY, NATIONAL UNIVERSITY CORPORATION, Fukuoka (JP)

(72) Inventors: Naoyuki Oshiumi, Yokkaichi (JP); Takehiro Hosokawa, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, ANTIONAL UNIVERSITY CORPORATION, Fukuoka (JP)

( * ) Notice: Subject to any disclaimer, the term of this patent is extended or adjusted under 35 U.S.C. 154(b) by 0 days.

(21) Appl. No.: 17/292,188

(22) PCT Filed: Nov. 11, 2019

(86) PCT No.: PCT/JP2019/044093
§ 371 (c)(1),
(2) Date: May 7, 2021

(87) PCT Pub. No.: WO2020/100678
PCT Pub. Date: Jun. 4, 2020

(65) Prior Publication Data
US 2021/0388215 A1 Dec. 16, 2021

(30) Foreign Application Priority Data

Nov. 28, 2018 (JP) .............................. JP2018-222586

(51) Int. Cl.
*C09D 5/08* (2006.01)
*C09D 7/63* (2018.01)
(Continued)

(52) U.S. Cl.
CPC ................ *C09D 5/08* (2013.01); *C08L 33/12* (2013.01); *C09D 7/63* (2018.01); *C23F 11/167* (2013.01);
(Continued)

(58) Field of Classification Search
CPC .......... H01B 3/44; H01B 7/02; H01B 7/2806; H01R 4/20; H01R 4/62; C09D 5/08; C09D 201/00
(Continued)

(56) References Cited

U.S. PATENT DOCUMENTS

| 8,044,003 B2 | 10/2011 | Miyamoto et al. |
| 10,079,439 B2 | 9/2018 | Hase et al. |

(Continued)

FOREIGN PATENT DOCUMENTS

| CN | 101687954 A | * | 3/2010 | ............... C09D 4/00 |
| CN | 105051992 A | | 11/2015 | |

(Continued)

OTHER PUBLICATIONS

Sep. 18, 2021 Office Action issued in Chinese Patent Application No. 201980074216.3.
(Continued)

*Primary Examiner* — William H. Mayo, III
(74) *Attorney, Agent, or Firm* — Oliff PLC

(57) ABSTRACT

A surface protection composition forms a uniform film, and a terminal fitted electric wire coated with the composition,
(Continued)

the composition containing (a) a phosphorus compound represented by the formula (1) in an amount of 0.1 to 10 mass % in terms of phosphorus element, (b) a metal-containing compound in an amount of 0.1 to 10 mass % in terms of metal element or an amine compound in an amount of 0.1 to 5.0 mass % in terms of nitrogen element, (c) a (meth)acrylate compatible with a solvent with a solubility parameter of 8.2 or lower and has a hydrocarbon chain with 4 or higher carbon atoms in an amount of 1.0 to 70 mass %, and (d) at least one of a photopolymerization initiator and a thermal polymerization initiator in an amount of 0.1 to 10 mass %, with respect to the total amount of the composition.

10 Claims, 2 Drawing Sheets

(51) Int. Cl.
| | |
|---|---|
| C08L 33/12 | (2006.01) |
| C23F 11/167 | (2006.01) |
| H01B 1/02 | (2006.01) |
| H01B 3/44 | (2006.01) |
| H01B 7/02 | (2006.01) |
| H01B 7/28 | (2006.01) |

(52) U.S. Cl.
CPC ............. *H01B 1/026* (2013.01); *H01B 3/44* (2013.01); *H01B 7/02* (2013.01); *H01B 7/2806* (2013.01); *C08L 2203/202* (2013.01)

(58) Field of Classification Search
USPC .................... 174/74 R, 78, 84 R, 88 R, 84 C
See application file for complete search history.

(56) References Cited

U.S. PATENT DOCUMENTS

| | | | | |
|---|---|---|---|---|
| 2005/0186442 A1* | 8/2005 | Gros | ........................ | C23C 28/00 428/626 |
| 2006/0264573 A1 | 11/2006 | Bennett et al. | | |
| 2015/0368389 A1 | 12/2015 | Tanaka et al. | | |
| 2017/0062954 A1 | 3/2017 | Hase et al. | | |
| 2017/0117650 A1* | 4/2017 | Yoshida | ............... | C10M 163/00 |
| 2018/0163058 A1* | 6/2018 | Nakashima | ............ | C09D 5/084 |
| 2018/0179400 A1* | 6/2018 | Nakashima | ............ | C09D 7/40 |
| 2019/0106652 A1 | 4/2019 | Takata et al. | | |
| 2019/0173213 A1* | 6/2019 | Takata | ..................... | H01R 4/70 |

FOREIGN PATENT DOCUMENTS

| | | | | |
|---|---|---|---|---|
| CN | 107636098 A | | 1/2018 | |
| CN | 108884409 A | | 11/2018 | |
| JP | H06-033272 A | | 2/1994 | |
| JP | 2003-530442 A | | 10/2003 | |
| JP | 2008-540811 A | | 11/2008 | |
| JP | 2009-007568 A | | 1/2009 | |
| JP | 2014-065788 A | | 4/2014 | |
| JP | 2015-151614 A | | 8/2015 | |
| JP | 2015-183220 A | | 10/2015 | |
| JP | 2017002300 A | * | 1/2017 | ........... C09D 201/00 |
| JP | 2017-052899 A | | 3/2017 | |
| JP | 2017-095641 A | | 6/2017 | |
| JP | 2018-131563 A | | 8/2018 | |
| JP | 2018-177924 A | | 11/2018 | |
| WO | 2007/052522 A1 | | 5/2007 | |

OTHER PUBLICATIONS

U.S. Appl. No. 17/292,250, filed May 7, 2021 in the name of Oshiumi et al.

Feb. 10, 2020 International Search Report issued in International Patent Application No. PCT/JP2019/044093.

Feb. 10, 2020 International Search Report issued in International Patent Application No. PCT/JP2019/044092.

Dec. 3, 2021 Office Action in issued in Chinese Patent Application No. 201980074192.1.

\* cited by examiner

SURFACE PROTECTION COMPOSITION AND TERMINAL FITTED ELECTRIC WIRE

TECHNICAL FIELD

The present disclosure relates to a surface protection composition and a terminal fitted electric wire, and more specifically a surface protection composition excellent in anticorrosion performance to prevent metal corrosion and a terminal fitted electric wire excellent in anticorrosion performance treated with the surface protection composition.

BACKGROUND ART

Grease, etc. are used in metal equipment and metal parts with the aim of lubrication, anticorrosion, etc. For example, Patent Literature 1 describes that a grease containing a perfluoroether base oil, a consistency improver, and barium sulfate or antimony oxide is used for machine parts. Further, for example, Patent Literature 2 describes that a substance formed by adding a gelling agent to a lubricating base oil is used as a composition for protecting a metal surface.

CITATION LIST

Patent Literature

Patent Literature 1: International Publication WO2007/052522
Patent Literature 2: JP H06-33272 A

SUMMARY OF INVENTION

Problems to be Solved by the Invention

The compositions described in Patent Literatures 1 and 2 exhibit inferior adsorption force to the metal and inferior anticorrosion performance to prevent metal corrosion since the compositions do not contain metal adsorbing components. Further, a grease is also a semi-solid or solid material in which a consistency improver is dispersed in a lubricating base oil. Since the viscosity of a grease decreases greatly on heating, coating with a grease is made easier by heating. However, a grease flows out easily by heating. The composition in Patent Literature 2 has a state like a solidified agar by adding the gelling agent to the lubricating base oil, and the composition tends to become liquid easily when heated. Thus, coating with the composition is made easier by heating. It is possible to prevent the composition in Patent Literature 2 from flowing out even under the high temperature conditions by selecting gelling agents appropriately; however, if the composition is hard to flow out even under the high temperature conditions, the composition needs to be heated at a high temperature when used for coating of a metal surface. Considering the effect of heating on metal equipment or metal parts to be coated and the manufacturing cost for heating, the composition of Patent Literature 2, which utilizes change of the state with the temperature for coating and curing, does not necessarily satisfy the coating properties and heat resistance. Further, in some types of gelling agents, the compatibility of the entire composition becomes poor, and there is a risk that sufficient anticorrosion performance may not be exhibited.

A problem to be solved by the present disclosure is to provide: a surface protection composition that is excellent in coating properties, forms a uniform film, and is excellent in anticorrosion performance to prevent metal corrosion; and a terminal fitted electric wire treated with the surface protection composition.

Means of Solving the Problems

A surface protection composition according to the present disclosure contains: (a) a phosphorus compound represented by the following general formula (1) in an amount of 0.1 to 10 mass % in terms of phosphorus element with respect to the total amount of the composition,

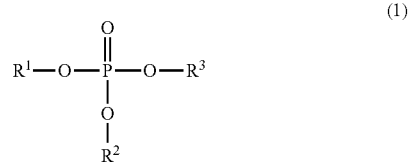

where $R^1$ represents a hydrogen atom, $R^2$ represents a hydrocarbon group having 4 to 30 carbon atoms, and $R^3$ represents a hydrogen atom or a hydrocarbon group having 4 to 30 carbon atoms; (b) a metal-containing compound in an amount of 0.1 to 10 mass % in terms of the metal element with respect to the total amount of the composition or an amine compound in an amount of 0.1 to 5.0 mass % in terms of nitrogen element with respect to the total amount of the composition; (c) a (meth)acrylate compatible having a solvent with a solubility parameter of 8.2 or lower in an amount of 1.0 to 70 mass % with respect to the total amount of the composition; and (d) at least one of a photopolymerization initiator and a thermal polymerization initiator in an amount of 0.1 to 10 mass % with respect to the total amount of the composition.

In the terminal fitted electric wire according to the present disclosure, an electric connection part between a terminal and an electric wire conductor is covered with a cured product of a surface protection composition according to the present disclosure.

Advantageous Effects of Invention

A surface protection composition according to the present disclosure is excellent in coating properties, forms a uniform film, and is excellent in anticorrosion performance to prevent metal corrosion.

In a terminal fitted electric wire according to the present disclosure, an electric connection part between a terminal fitting and an electric wire conductor is covered with a cured product of the surface protection composition that forms a uniform composition and is excellent in coating properties. The cured product forms a uniform film and is excellent in anticorrosion performance to prevent metal corrosion, and hence corrosion at the electric connection part is prevented.

DESCRIPTION OF EMBODIMENTS

Figure 1:
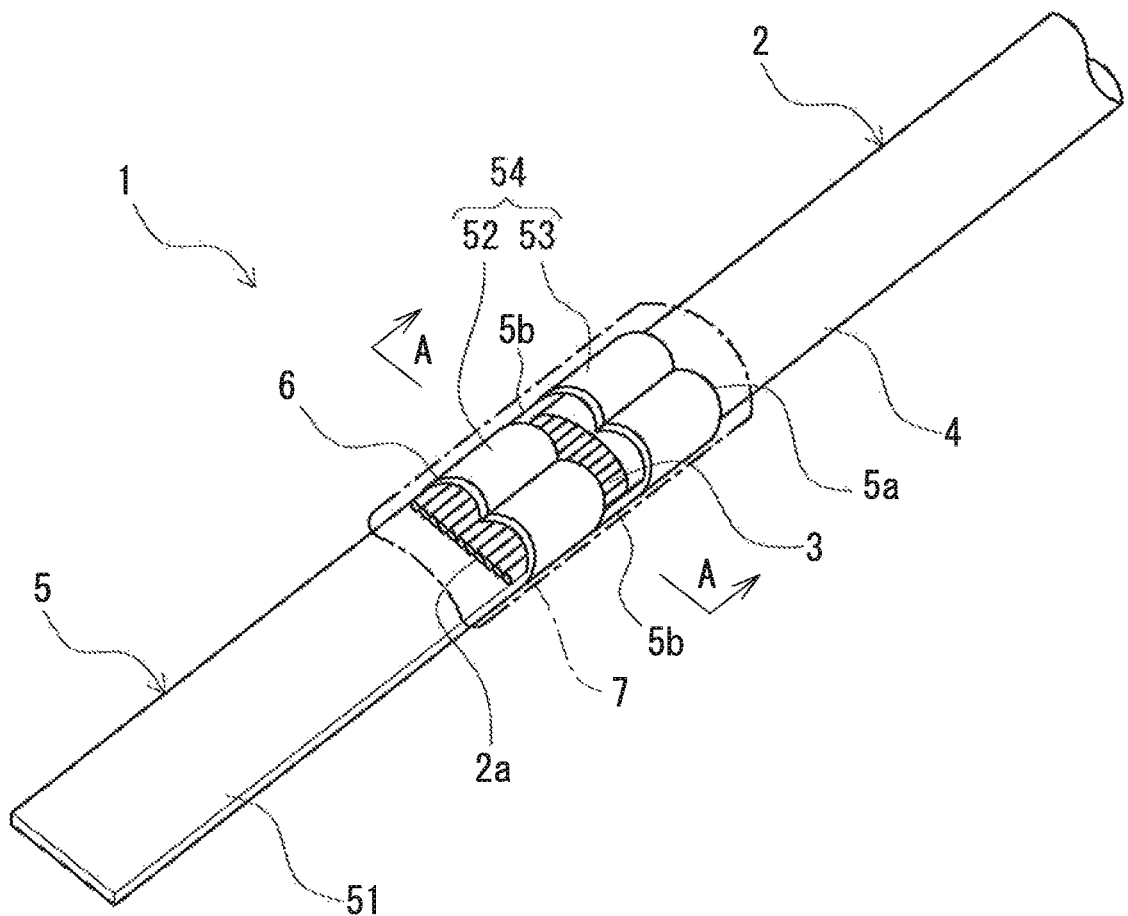
FIG. 1 is a perspective view of a terminal fitted electric wire according to an embodiment.

Explanation of Embodiments According to Present Disclosure

Firstly, embodiments according to the present disclosure are described and explained.

(1) A surface protection composition according to the present disclosure contains: (a) a phosphorus compound represented by the following general formula (1) in an amount of 0.1 to 10 mass % in terms of phosphorus element with respect to the total amount of the composition,

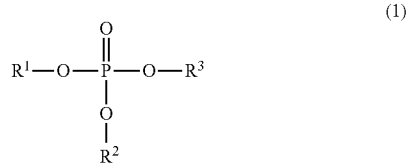

where $R^1$ represents a hydrogen atom, $R^2$ represents a hydrocarbon group having 4 to 30 carbon atoms, and $R^3$ represents a hydrogen atom or a hydrocarbon group having 4 to 30 carbon atoms; (b) a metal-containing compound in an amount of 0.1 to 10 mass % in terms of the metal element with respect to the total amount of the composition or an amine compound in an amount of 0.1 to 5.0 mass % in terms of nitrogen element with respect to the total amount of the composition; (c) a (meth)acrylate compatible with a solvent having a solubility parameter of 8.2 or lower in an amount of 1.0 to 70 mass % with respect to the total amount of the composition; and (d) at least one of a photopolymerization initiator and a thermal polymerization initiator in an amount of 0.1 to 10 mass % with respect to the total amount of the composition.

The surface protection composition according to the present disclosure contains (a) the compound, and (b) the metal-containing compound or the amine compound and hence can be adsorbed on a coated metal surface. Further, by containing (c) the (meth)acrylate and (d) the photopolymerization initiator, the composition can be prepared in a liquefied state before cured and has excellent coating properties. Further, (c) the (meth)acrylate is a (meth)acrylate that is compatible with a solvent with a solubility parameter of 8.2 or lower and hence the composition does not cause phase separation or cloudiness, and a uniform liquid is obtained. A coating film formed from such a uniform composition becomes a uniform film and hence can sufficiently exhibit anticorrosion performance to prevent metal corrosion.

(2) It is preferable that the metal in the metal-containing compound (b) is at least one selected from the group consisting of alkali metals, alkaline earth metals, aluminum, titanium, and zinc. With this arrangement, the phosphorous compound (a) can be strongly adsorbed on a coated metal surface.

(3) It is preferable that at least one of the hydrocarbon groups having 4 to 30 carbon atoms in the above compound (a) has one or more branched chains or one or more carbon-carbon double bonds. With this arrangement, orientation between hydrocarbon groups in the compound (a) is suppressed, the crystallinity of the compound (a) decreases, and hence compatibility with the compound (c) improves.

(4) It is preferable that a mass ratio ((a)+(b)):(c) of the total of the compound (a) and the compound (b) to the compound (c) is within a range of 98:2 to 10:90. With this arrangement, the composition obtains an excellent balance between the effect of making the cured product of the present protection composition difficult to melt at high temperatures, and the effect of suppressing the corrosion of a metal surface due to strong adsorption force of the surface protection composition to the metal surface.

(5) The surface protection composition may further contain (e) lubricating base oil in an amount of 10 to 90 mass % with respect to the total amount of the composition. With this arrangement, the coating properties of the present protection composition at room temperature improve.

(6) In a terminal fitted electric wire according to the present disclosure, an electric connection part between the terminal and the electric conductor is covered with a cured product of the surface protection composition according to the present disclosure. The terminal fitted electric wire according to the present disclosure is excellent in coating properties, forms a uniform film, and is excellent in anticorrosion performance to prevent metal corrosion.

Details of Embodiments According to Present Disclosure

Concrete examples of a surface protection composition according to the present disclosure are explained hereunder in reference to the drawings. However, the present disclosure is not limited to those examples.

A surface protection composition according to the present disclosure (hereinafter, it may be referred to as the present protection composition) contains the below-described compounds (a) to (d). The present protection composition may further contain the following compound (e) in addition to the below-described compounds (a) to (d).

The compound (a) is a phosphorus compound represented by the following general formula (1). The phosphorus compound has a low-polarity portion (i.e., lipophilic portion) composed of hydrocarbon groups and a high-polarity portion containing a phosphate group, as represented by the following general formula (1).

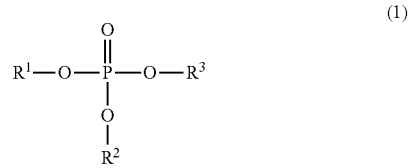

In the above-presented general formula (1), $R^1$ represents a hydrogen atom, $R^2$ represents a hydrocarbon group having 4 to 30 carbon atoms, and $R^3$ represents a hydrogen atom or a hydrocarbon group having 4 to 30 carbon atoms.

Examples of the hydrocarbon groups include an alkyl group, a cycloalkyl group, an alkyl-substituted cycloalkyl group, an alkenyl group, an aryl group, an alkyl-substituted aryl group, and an arylalkyl group. Among these, an alkyl group, a cycloalkyl group, an alkyl-substituted cycloalkyl group and an alkenyl group, which are aliphatic hydrocarbon groups or alicyclic hydrocarbon groups, are preferable. When each of the hydrocarbon groups of the compound (a) is an aliphatic hydrocarbon group or an alicyclic hydrocarbon group, the compatibility with the lubricating base oil (e), if contained in the composition, is improved.

The alkyl group may be linear or branched. Examples of the alkyl group include butyl group, isobutyl group, tert-butyl group, pentyl group, hexyl group, heptyl group, octyl group, 2-ethylhexyl group, nonyl group, decyl group, undecyl group, dodecyl group, tridecyl group, tetradecyl group, pentadecyl group, hexadecyl group, heptadecyl group, octadecyl group (i.e., stearyl group), isostearyl group, butyloctyl group, myristyl group, isomyristyl group, isocetyl group, hexyldecyl group, octyldecyl group, octyldodecyl group, behenyl group, and isobehenyl group.

Examples of the cycloalkyl group include cyclopentyl group, cyclohexyl group, and cycloheptyl group. Examples of the alkyl-substituted cycloalkyl group include a methylcyclopentyl group, a dimethylcyclopentyl group, a methylethylcyclopentyl group, a diethylcyclopentyl group, a methylcyclohexyl group, a dimethylcyclohexyl group, a methylethylcyclohexyl group, a diethylcyclohexyl group, a methylcycloheptyl group, and a dimethylcycloheptyl group, a methylethylcycloheptyl group, and a diethylcycloheptyl group. The substitution position of the alkyl-substituted cycloalkyl group is not particularly limited.

The alkenyl group may be linear or branched. Examples of the alkenyl group include butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, octadecenyl group, and oleyl group.

Examples of the aryl group include phenyl group and naphthyl group. Examples of the alkyl-substituted aryl group include a tolyl group, a xylyl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undecylphenyl group, and a dodecylphenyl group. The substitution position of the alkyl-substituted aryl group is not particularly restricted. The alkyl group of the alkyl-substituted aryl group may be linear or branched. Examples of the arylalkyl group include benzyl group, phenylethyl group, phenylpropyl group, phenylbutyl group, phenylpentyl group, and phenylhexyl group. The alkyl group of the arylalkyl group may be linear or branched.

In the compound (a), at least one of the hydrocarbon groups having 4 to 30 carbon atoms is preferably a hydrocarbon group having 8 to 30 carbon atoms. Further, in the compound (a), at least one of the hydrocarbon groups having 4 to 30 carbon atoms preferably has one or more branched chains or one or more carbon-carbon double bonds. When a hydrocarbon group in the compound (a) has branched chains or carbon-carbon double bonds, the orientation of the hydrocarbon groups of the compound (a) is suppressed, and crystallinity of the compound (a) is reduced. This results in improved compatibility with the compound (c). When the lubricating base oil (e) is contained in the composition, compatibility with the lubricating base oil (e) is also improved.

Specific examples of the phosphorus compound represented by the above-presented general formula (1) include butyloctyl acid phosphate, isomyristyl acid phosphate, isocetyl acid phosphate, hexyldecyl acid phosphate, isostearyl acid phosphate, isobehenyl acid phosphate, octyldecyl acid phosphate, octyldodecyl acid phosphate, isobutyl acid phosphate, 2-ethylhexyl acid phosphate, isodecylacidphosphate, laurylacidphosphate, tridecyl acid phosphate, stearyl acid phosphate, oleyl acid phosphate, myristyl acid phosphate, palmityl acid phosphate, dibutyl octyl acid phosphate, diisomyristyl acid phosphate, diisocetyl acid phosphate, dihexyl decyl acid phosphate, diisostearyl acid phosphate, diisobehenyl acid phosphate, dioctyldecyl acid phosphate, dioctyldodecyl acid phosphate, diisobutyl acid phosphate, di-2-ethylhexyl acid phosphate, diisodecyl acid phosphate, ditridecyl acid phosphate, dioleyl acid phosphate, dimyristylacidphosphate, and dipalmityl acid phosphate.

The composition contains the compound (a) in an amount of 0.1 to 10 mass % in terms of phosphorus element with respect to the total amount of the composition. If the amount of the compound (a) is smaller than 0.1 mass % in terms of phosphorus element with respect to the total amount of the composition, the surface protection composition has weak adsorption force to the metal surface and has low effect of suppressing corrosion of the metal surface. If the amount of the compound (a) is larger than 10 mass % in terms of phosphorus element with respect to the total amount of the composition, the amount of the compound (c) which can be contained in the composition is accordingly too small to forma gel with a high melting point and sufficient heat resistance even when the surface protection composition is cured. Further, from the viewpoint of adsorption force to a metal surface, the compound (a) is, in terms of phosphorus element with respect to the total amount of the composition, preferably 0.5 mass % or larger and yet preferably 1.0 mass % or larger. Furthermore, from the viewpoint of heat resistance, the compound (a) is, in terms of phosphorus element with respect to the total amount of the composition, preferably 8.0 mass % or lower and yet preferably 5.0 mass % or lower.

The compound (b) is a metal-containing compound or an amine compound. These may be used alone or two or more of them may be used in combination. On the metal surface coated with the present protection composition, the compound (b) promotes ionization of metal on the metal surface and thus enhances adsorption of the phosphorus compound onto the metal surface. Thus, the present protection composition can be adsorbed on the metal surface. Examples of the metal-containing compounds include a metal hydroxide and a metal oxide.

Examples of the metal of the metal-containing compound include alkali metals such as Li, Na, and K, alkaline earth metals such as Mg and Ca, aluminum, titanium, and zinc. These may be used alone, or two or more of them may be used in combination. These metals have relatively high ionization tendency. Thus, ionization of the metal atoms at the metal surface is promoted and the phosphorus compound can be strongly adsorbed on the metal surface.

The metal in the metal-containing compound preferably has a valence of two or higher like alkaline earth metals, aluminum, titanium, and zinc from a viewpoint of hydrophilicity. From a viewpoint of water-resisting property, Ca and Mg are more preferable.

The present protection composition contains the metal-containing compound in an amount of 0.1 to 10 mass % in terms of metal element with respect to the total amount of the composition. If the amount of the metal-containing compound is smaller than 0.1 mass % in terms of metal element with respect to the total amount of the composition, the adsorption force of the compound (a) through formation of an ionic bond is reduced. Thus, the effect of suppressing corrosion of the metal surface with the present protection composition would below. On the other hand, if the amount of the metal-containing compound is larger than 10 mass % in terms of metal element with respect to the total amount of the composition, an excess of the metal-containing compound significantly affects and impairs the protection effect of the composition. Furthermore, from a viewpoint of the adsorption force of a phosphorous compound of the compound (a), the present protection composition more preferably contains the metal-containing compound in an amount of 0.5 mass % or larger and yet preferably 1.0 mass % or larger in terms of metal element with respect to the total amount of the composition. In addition, the present protection composition more preferably contains the metal-containing compound (a) in an amount of 8.0 mass % or smaller and yet preferably 5.0 mass % or smaller in terms of metal element with respect to the total amount of the composition.

Examples of the amine compound includes an organic amine compound having a hydrocarbon group with 2 to 100 carbon atoms, and more preferably an organic amine compound having a hydrocarbon group with 2 to 22 carbon atoms. From a viewpoint of oxidation stability, the organic amine compound still more preferably has a hydrocarbon group having eight or more carbon atoms. The organic amine compounds may be any of primary, secondary and tertiary organic amine compounds.

More specifical examples of the amine compound include octylamine, laurylamine, myristylamine, stearylamine, behenylamine, oleylamine, tallow alkylamine, cured tallow alkylamine, aniline, benzylamine, cyclohexylamine, diethylamine, dipropylamine, dibutylamine, diphenylamine, dibenzylamine, dicyclohexylamine, triethylamine, tributylamine, dimethyloctylamine, dimethyldecylamine, dimethylstearylamine, dimethyl tallow alkylamine, dimethyl-cured tallow alkylamine, and dimethyloleylamine. These may be used alone, or two or more of them may be used in combination. Octylamine and stearylamine are preferred among these.

The present protection composition contains an amine compound in an amount of 0.1 to 5.0 mass % in terms of nitrogen element with respect to the total amount of the composition. When the amount of an amine compound is smaller than 0.1 mass % in terms of nitrogen element with respect to the total amount of the composition, the adsorption force of the compound (a) through formation of an ionic bond is reduced. Thus, the effect of suppressing the corrosion of the metal surface with the present protection composition would below. On the other hand, when the amount of the amine compound is larger than 5.0 mass % in terms of nitrogen element with respect to the total amount of the composition, an excess of the amine compound affects and impairs the protection effect of the composition. Furthermore, from a viewpoint of the adsorption force of the phosphorous compound (a), the present protection composition more preferably contains the amine compound in an amount of 0.3 mass % or larger and even more preferably in an amount of 0.5 mass % or larger in terms of nitrogen element with respect to the total amount of the composition. The present protection composition more preferably contains the amine compound in an amount of 3.0 mass % or smaller and even more preferably 2.0 mass % or lower in terms of nitrogen element with respect to the total amount of the composition.

The compound (c) is a specific (meth)acrylate. Many (meth)acrylates are liquid at room temperature. Further, a (meth)acrylate forms a cured product excellent in heat resistance by photo-curing or thermosetting. If a (meth)acrylate of the compound (c) is excellent in compatibility with the compound (a), a mixture of the compounds (a) and (b), and the compound (e) which will be described below, the compound (a), a mixture of the compounds (a) and (b), and the compound (e) described below are held in a polymer of the compound (c), and thus the compound (a), a mixture of the compounds (a) and (b), and the compound (e) described below become hard to flow out under a high temperature. As a result, the present protection composition is easy to be applied even at room temperature and has excellent coating properties. Further, a cured product of the present protection composition hardly melts at a high temperature and has excellent heat resistance.

The compound (c) is a (meth)acrylate that is compatible with a solvent with a solubility parameter of 8.2 or lower.

The compound (a), a mixture of the compounds (a) and (b), and the compound (e) described below are compatible with a solvent with a solubility parameter of 8.2 or lower. In a composition containing the compound (a), a mixture of the compounds (a) and (b), and the compound (e) described below, by using the (meth)acrylate compatible with a solvent with a solubility parameter of 8.2 or lower as the compound (c), phase separation and cloudiness are not caused and a uniform liquid is obtained. A coating film formed from such a uniform composition becomes a uniform film and hence can sufficiently exhibit anticorrosion performance to prevent metal corrosion.

It is preferable that the compound (c) does not have a polar group at a part other than a (meth)acryloyl group. As a result, a side chain of a (meth)acrylic polymer does not become a polar group and hence the compound (c) becomes easily compatible with the solvent with a solubility parameter of 8.2 or lower. Such (meth)acrylates include alkyl (meth)acrylate, cycloalkyl (meth)acrylate, alkylated cycloalkyl (meth)acrylate, alkenyl (meth)acrylate, aryl (meth)acrylate, alkylated aryl (meth)acrylate, and arylalkyl (meth)acrylate.

The compound (c) may contain a substance having two or more carbon-carbon double bonds. That is, the compound (c): may comprise only a substance having one carbon-carbon double bond; may contain a substance having one carbon-carbon double bond and a substance having two or more carbon-carbon double bonds; or may comprise only a substance having two or more carbon-carbon double bonds. A (meth)acrylate having two or more carbon-carbon double bonds becomes a polymer of a three-dimensional structure through photopolymerization or thermal polymerization and becomes harder to melt at a high temperature and hence, if a substance having two or more carbon-carbon double bonds is contained, a cured product of the present protection composition becomes superior in heat resistance.

Carbon-carbon double bonds in the compound (c) may be carbon-carbon double bond in a (meth)acryloyl group and in an alkenyl group. The (meth)acrylate of the compound (c) may be a monofunctional (meth)acrylate having an alkenyl group. Alternatively, regardless of whether or not the (meth)acrylate has an alkenyl group, the (meth)acrylate may be a bifunctional or higher functional (meth)acrylate. The (meth)acrylate includes either one or both of an acrylate and a methacrylate.

It is preferable that the compound (c) has a hydrocarbon chain with 4 or more carbon atoms. In the compound (c), a hydrocarbon chain with 4 or more carbon atoms may be any of linear, branched, or cyclic. Further, one or more carbon-carbon double bonds may be contained. The hydrocarbon chain with 4 or more carbon atoms is preferably a hydrocarbon chain with 8 or more carbon atoms. Further, the hydrocarbon chain with 4 or more carbon atoms is a hydrocarbon chain preferably with 30 or less carbon atoms and yet preferably with 22 or less carbon atoms. Examples of the hydrocarbon chain having four or more carbon atoms include an alkyl chain, a cycloalkyl chain, an alkylated cycloalkyl chain, an alkenyl chain, an aryl chain, an alkylated aryl chain, and an arylalkyl chain. Among these, an alkyl chain, a cycloalkyl chain, an alkylated cycloalkyl chain, and an alkenyl chain, which are aliphatic hydrocarbon chains and alicyclic hydrocarbon chains, are preferable.

Examples of the (meth)acrylate (c) include monofunctional (meth)acrylates such as heptyl (meth)acrylate, octyl (meth)acrylate, nonyl (meth)acrylate, decyl (meth)acrylate, dodecyl (meth)acrylate, tetradecyl (meth)acrylate, hexadecyl (meth)acrylate, heptadecyl (meth)acrylate, dicyclopentenyl (meth)acrylate, and dicyclopentenyloxyethyl (meth)acrylate; and polyfunctional (meth)acrylates such as butanediol di(meth)acrylate, hexanediol di(meth)acrylate, nonanediol di(meth)acrylate, decanediol di(meth)acrylate, 2-butyl-2-ethyl-1,3-propanediol di(meth)acrylate, tricyclodecanedimethanol di(meth)acrylate, neopentyl glycol di(meth)acrylate, di(meth)acrylate of EO modified bisphenol A, di(meth)acrylate of EO or PO modified hydrogenated bisphenol A, bis[4-(2-acryloyloxyethoxy)phenyl]fluorene, trimethylolpropane tri(meth)acrylate, and pentaerythritol tri(meth)acrylate. These may be used alone as the compound (c) or may be used in combination of two or more.

The present protection composition contains the compound (c) in an amount of 1.0 to 70 mass % with respect to the total amount of the composition. If the amount of the compound (c) is smaller than 1.0 mass % with respect to the total amount of the composition, the compound (c) provides only low effect to prevent the cured product of the present protection composition from melting at a high temperature. On the other hand, if the amount of the compound (c) is larger than 70 mass %, the amount of the compound (a) which can be contained in the composition is accordingly too small, whereby the present protection composition would have weak adsorption force to the metal surface and have low effect to prevent corrosion of the metal surface. To be difficult to melt at a high temperature, the present protection composition preferably contains the compound (c) in an amount of 5.0 mass % or larger with respect to the total amount of the composition, and more preferably in an amount of 10 mass % or larger. From a viewpoint of the adsorption force to the metal surface, the present protection composition more preferably contains the compound (c) in an amount of 50 mass % or smaller, and even more preferably in amount of 30 mass % or smaller.

When the amount of the compound (c) is described in relation to the amount of the compounds (a) and (b), it is preferable that the mass ratio ((a)+(b)):(c) of the total of the compounds (a) and (b) to the compound (c) is within the range of 98:2 to 10:90. When the amount of the compound (c) with respect to the total of the compounds (a) to (c) is 2.0 mass % or larger, or when the amount of compounds (a) and (b) with respect to the total of the compounds (a) to (c) is in an amount of 98 mass % or smaller, an excellent effect is provided to prevent the cured product of the present protection composition from melting at a high temperature. From this viewpoint, the amount of the compound (c) with respect to the total of the compounds (a) to (c) is more preferably 5.0 mass % or larger, still more preferably 10 mass % or larger, and even more preferably 20 mass % or larger. On the other hand, when the amount of the compound (c) with respect to the total of the compounds (a) to (c) is 90 mass % or smaller, or when the amount of compounds (a) and (b) with respect to the total of the compounds (a) to (c) is 10 mass % or larger, the surface protection composition exhibits strong adsorption force and an excellent effect is provided to prevent the corrosion at the metal surface. From this viewpoint, the amount of the compound (c) with respect to the total of the compounds (a) to (c) is more preferably 85 mass % or smaller, and even more preferably 80 mass % or smaller.

The compound (d) is at least one of a photopolymerization initiator and a thermal polymerization initiator. The photopolymerization initiator is not particularly limited as long as it is a chemical compound that absorbs light such as ultraviolet rays to initiate radical polymerization, and conventionally known ones can be used. Examples of the compound (d) include 1-hydroxycyclohexyl phenyl ketone, 2,2-dimethoxy-2-phenylacetophenone, xanthone, fluorenone, benzaldehyde, anthraquinone, ethyl anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethyl thioxanthone, 2-isopropyl thioxanthone, 2-chlorothioxanthone, 2-methyl-1-[4-(methylthio)phenyl]-2-morpholino-propane-1-one, 2,4,6-trimethylbenzoyldiphenylphosphine oxide, and bis(2,6-dimethoxybenzoyl)-2,4,4-trimethylpentyl phosphine oxide. These may be used alone as the compound (d) or may be used in combination of two or more. Examples of the compound (d) include commercially available products such as IRGACURE 184, 369, 651, 500, 907, CGI 1700, CGI 1750, CGI 1850, CG24-61; Darocure 1116, 1173, Lucirin TPO (these are product names of BASF Corporation), Ubecryl P36 (product name from UCB, Inc.). The thermal polymerization initiator is not particularly limited as long as it is a chemical compound to initiate radical polymerization by heat and conventionally known ones can be used. An example of the thermal polymerization initiator includes peroxides. Examples of the peroxides include dicumyl peroxide and benzoyl peroxide. The present composition contains the compound (d) in an amount of 0.1 to 10 mass % with respect to the total amount of the composition.

The compound (e) is a lubricating base oil. When the present protection composition contains the compound (e), coating properties of the present protection composition can be improved at room temperature. The present protection composition preferably contains the compound (e) in an amount of 10 to 90 mass % with respect to the total amount of the composition, and more preferably in an amount of 30 to 70 mass %.

The lubricant base oil used herein includes any one of a mineral oil, a wax isomerized oil, and a synthetic oil, which are usually used as base oils of lubricant oils. They may be used alone or two or more of them may be used in combination. Specific examples of the mineral oil include paraffinic and naphthenic oils, and n-paraffin, which are purified from lubricant oil fractions obtained by distillation under ordinary pressure or distillation under reduced pressure of crude oils by appropriately combining purification treatments such as solvent deasphalting, solvent extraction, hydrocracking, solvent dewaxing, catalytic dewaxing, hydrorefining, sulfuric acid cleaning, and white clay treatment of a lubricant oil fractions.

The isomerized oils used herein include those prepared through a hydrogen isomerization treatment of a wax raw material, such as natural wax, e.g., petroleum slack wax obtained through solvent dewaxing of a hydrocarbon oil, or a synthetic wax formed through the so-called Fischer Tropsch synthetic process, in which a mixture of carbon monoxide and hydrogen is brought in contact with a suitable synthetic catalyst at a high temperature and a high pressure. In the case of using the slack wax as the wax raw material, since the slack wax contains large amounts of sulfur and nitrogen, which are unnecessary in the lubricant base oil, it is desirable that the slack wax is hydrogenated as needed to prepare a wax raw material reduced in the sulfur content and the nitrogen content.

Although not particularly limited, examples of the synthetic oil include a poly-α-olefin, such as 1-octene oligomer, 1-decene oligomer, and ethylene-propylene oligomer and a hydrogenated product thereof, isobutene oligomer and hydrogenated products thereof, isoparaffin, alkylbenzene, alkylnaphthalene, diester (for example, ditridecyl glutarate, di-2-ethylhexyl adipate, diisodecyl adipate, ditridecyl adipate, and di-2-ethylhexyl sebacate), polyol ester (for example, trimethylolpropane caprylate, trimethylolpropane pelargonate, pentaerythritol-2-ethylhexanoate, and pentaerythritol pelargonate), polyoxyalkylene glycol, dialkyl diphenyl ether, and polyphenyl ether.

Although the kinematic viscosity of the lubricant base oil is not particularly limited, usually the kinematic viscosity is preferably in the range of 1 to 150 mm$^2$/s at 100° C. The kinematic viscosity at 100° C. is more preferably within a range of 2 to 130 mm$^2$/s because the volatility and the handleability in production are excellent. The kinematic viscosity is measured according to JIS K 2283.

To the present protection composition, an addictive such as a stabilizer, a corrosion inhibitor, a dye, a viscosity improver, and a filler can be added as long as the function of the present protection composition is not deteriorated.

The present protection composition may be prepared by mixing of the compounds (a) to (d) all together, or may be prepared by addition of the compounds (c) and (d) to a mixture of the compounds (a) and (b). When the present protection composition contains the compound (e) and/or additives, the protection composition may be prepared by mixing of the compounds (a) to (d) and the additives all together, or may be prepared by addition of the compounds (c) to (e) and the additives to a mixture of the compounds (a) and (b).

The surface of a material to be coated can be coated with the present protection composition by application of the present protection composition onto the surface of the material or immersion of the material into the present protection composition. Examples of the material to be coated include metal materials. Examples of the metal species of the metal materials include Cu, Cu alloys, Al, Al alloys, metal materials having various plated layers on these materials, which are preferably used for terminal fittings, wire conductors, etc. The present protection composition can be cured by irradiation of light such as ultraviolet after coating of the surface of the metal to be coated. Thus, the surface of the metal to be coated is covered with the cured product of the present protection composition. The film thickness of the cured product of the present protection composition is not particularly restricted and may be adjusted to about 0.5 to 100 μm.

As described above, the present protection composition contains (a) the phosphorus compound, and (b) the metal-containing compound or the amine compound. Thus, the present composition can be adsorbed on the covering metal surface. Further, as described above, the present protection composition contains (c) the (meth)acrylate and (d) the photopolymerization initiator, and thus the composition can be liquefied before cured and has excellent coating properties. Further, since the compound (c) is a (meth)acrylate compatible with a solvent with a solubility parameter of 8.2 or lower, phase separation and cloudiness are not caused and a uniform liquid is obtained. A coating film formed from such a uniform composition becomes a uniform film and hence can sufficiently exhibit anticorrosion performance to prevent metal corrosion.

The present protection composition can be used for anticorrosion. For example, the present protection composition can be used to cover a surface of a metal part to be protected with closely contacting the surface, thereby preventing corrosion of the metal part. For example, a terminal-fitted electric wire may be covered with the present protection composition for preventing corrosion.

Next, a terminal-fitted electric wire of the present application is to be described.

A terminal-fitted electric wire of the present application contains an insulated wire and a terminal connected to an end of the conductor of the insulated wire. An electric connection part between the terminal and the conductor is covered with a cured product of the surface protection composition. The present protection composition forms a uniform composition and is excellent in coating properties. Thus, the cured product of the present protection composition forms a uniform film and is excellent in anticorrosion performance to prevent metal corrosion. Hence, the electric connection part is prevented from corroding.

Figure 2:
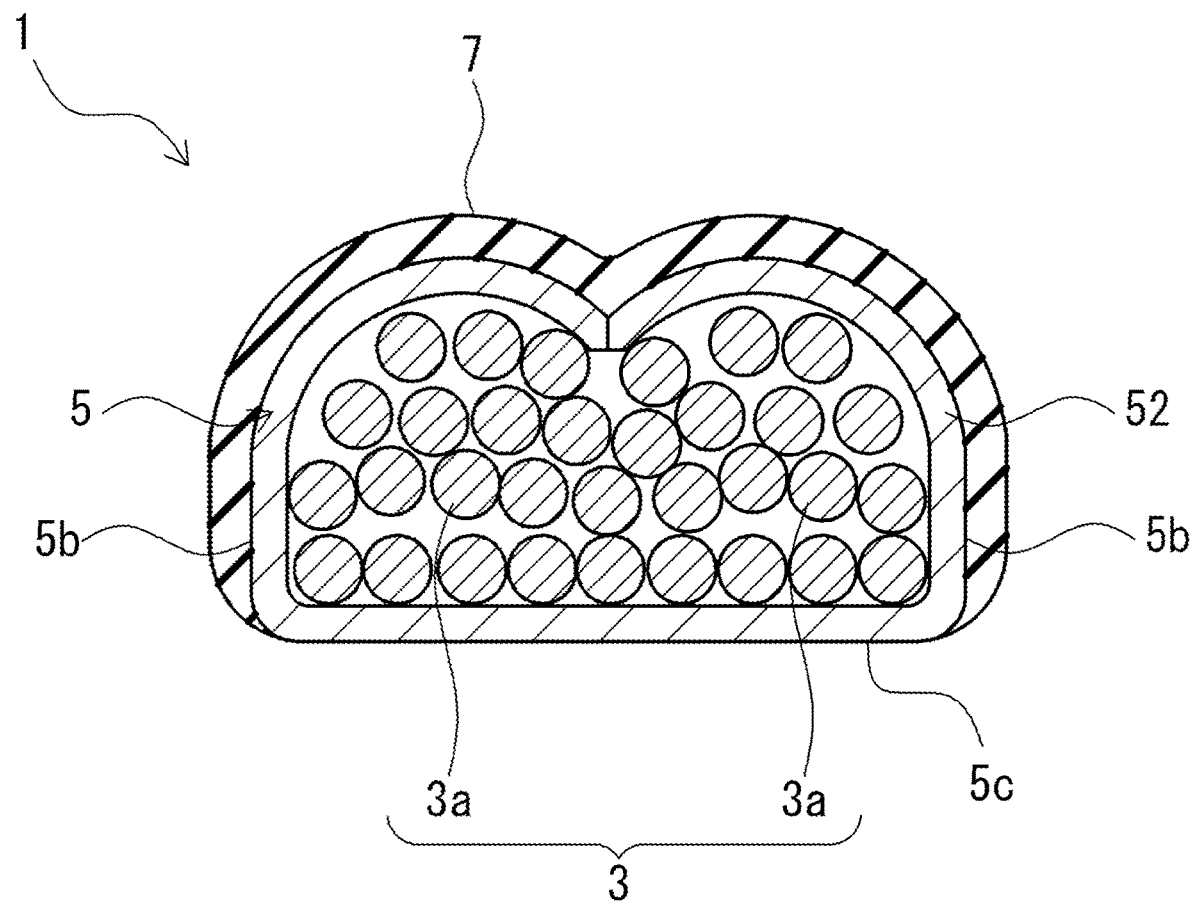
FIG. 2 is a longitudinal cross sectional view taken on line A-A in FIG. 1.

FIG. 1 is a perspective view of a terminal fitted electric wire according to a preferred embodiment of the present application, and FIG. 2 is a vertical cross sectional view along line A-A in FIG. 1. As illustrated in FIG. 1 and FIG. 2, a terminal-fitted electric wire 1 contains a covered electric wire 2 which contains an electric wire conductor 3 and an insulation covering (i.e., insulator) 4. The covered electric wire 2 and a terminal 5 are electrically connected through an electric connection part 6.

The terminal 5 has a tab-shaped connection part 51 formed as an elongate flat plate to be connected with a mating terminal, and an electric wire fixing part 54 containing a wire barrel 52 and an insulation barrel 53 formed at the extended end of the connection part 51. The terminal 5 can be formed (or fabricated) to a predetermined shape by pressing of a plate material made of a metal.

In the electric connection part 6, the insulation covering 4 at the end of the covered electric wire 2 is stripped off to expose the electric wire conductor 3, and the exposed electric wire conductor 3 is press-bonded to one side of the terminal 5 to connect the covered electric wire 2 with the terminal 5. The wire barrel 52 of the terminal 5 is crimped over the electric wire conductor 3 of the covered electric wire 2 to electrically connect the electric wire conductor 3 with the terminal 5. Further, the insulation barrel 53 of the terminal 5 is crimped over the insulation covering 4 of the covered electric wire 2.

In the terminal-fitted electric wire 1, an area surrounded by a dotted chain in FIG. 1 is covered with a cured product 7 of the present protection composition. Specifically, an area from the surface part of the terminal 5 ahead of the front end of the electric wire conductor 3 exposed from the insulation covering 4 to the surface part of the insulation covering 4 behind the backward end of the electric wire conductor 3 exposed from the insulation covering 4 is covered with the cured product 7. That is, the covered electric wire 2 is covered with the cured product 7 such that on the distal end 2a of the wire 2, the cured product 7 slightly extends off toward the connection part 51 of the terminal 5 from the distal end of the electric wire conductor 3. The terminal 5 is covered with the cured product 7 such that on the distal end 5a of the terminal 5, the cured product 7 slightly extends off toward the insulation covering 4 of the covered electric wire 2 from the end part of the insulation barrel 53. As shown in FIG. 2, side surfaces 5b of the terminal 5 are also covered with the cured product 7. A back surface 5c of the terminal 5 may not be covered with the cured product 7 or may be covered with the cured product 7. The peripheral edge of the cured product 7 includes a part in contact with the surface of the terminal 5, a part in contact with the surface of the electric wire conductor 3, and a part in contact with the surface of the insulation covering 4.

In this way, the electric connection part 6 is covered with the cured product 7 at a predetermined thickness along the shape of the outer periphery of the terminal 5 and the covered electric wire 2. Thus, a part of the electric wire 2 where the electric wire conductor 3 is exposed from the insulation covering 4 is completely covered with the cured product 7 so as not to be exposed to the outside. Accordingly, the electric connection part 6 is completely covered with the cured product 7. Since the cured product 7 has excellent adhesion to all of the electric wire conductor 3, the insulation covering 4, and the terminal 5, the cured product 7 prevents intrusion of moisture from the outside to the electric wire conductor 3 and the electric connection part 6, which may cause corrosion of the metal parts. Further, since the cured product 7 is excellent in adhesion, a gap is less likely to be formed between the cured product 7 and any of the electric wire conductor 3, the insulation covering 4, and the terminal 5 at the peripheral end of the cured product 7 even when the electric wire is bent, for example, in the processes from the production of the wire harness to the attachment to a vehicle, thereby maintaining the waterproofness and anticorrosion function.

The present protection composition forming the cured product 7 covers the predetermined area. For the application of the present protection composition forming the cured product 7, known methods such as dripping, and coating can be used.

The cured product 7 is formed at a predetermined thickness in a predetermined area. The thickness is, preferably, within a range of 0.01 to 0.1 mm. If the cured product 7 is excessively thick, it is difficult to insert the terminal 5 into a connector. On the other hand, if the cured product 7 is excessively thin, the anticorrosion function tends to be lowered.

The electric wire conductor 3 of the covered electric wire 2 is a stranded wire composed of a plurality of elemental wires 3a. In this case, the stranded wire may be composed of a single type of metal elemental wires or two or more types of metal elemental wires. Further, the stranded wire may also contain organic fibers in addition to metal elemental wires. The stranded wire composed of a single type of metal elemental wires means that all metal wires forming the stranded wire are formed of the same metal material, while the stranded wire composed of two or more types of metal elemental wires means that the stranded wire contains metal elemental wires formed of different metal materials. The stranded wire may also include reinforcing wires (i.e., tension members) for reinforcing the covered electric wire 2.

Examples of the material of metal elemental wires forming the electric wire conductor, 3 include copper, copper alloys, aluminum, aluminum alloys, and materials having various types of plated layers on the metals described above. The material of the metal wires as the reinforcing wires includes, for example, copper alloys, titanium, tungsten, and stainless steels. Further, the organic fibers as the reinforcing wires may be, for example, KEVLAR. The metal elemental wires forming the electric wire conductor 3 are preferably made of aluminum, aluminum alloys or materials having various types of plated layers on the metals from a viewpoint of reducing the weight.

The material for the insulation covering 4 may be, for example, rubber, polyolefin, PVC, or a thermoplastic elastomer. They may be used alone or two or more of them may be used in combination. Various additives may be added as required to the material of the insulation covering 4. Examples of the additives include flame retardants, fillers, and colorants.

The material for the terminal 5 (i.e., material for a substrate) may be various copper alloys, copper, etc. in addition to generally used brass. The surface of the terminal 5 may be plated with various metals such as tin, nickel, and gold partially (for example, on an area including the contact surface) or entirely.

While a terminal is press-bonded to the end of the electric wire conductor in the terminal-fitted electric wire 1 illustrated in FIG. 1, other known electric connection methods such as welding may also be used instead of the press-bonding connection.

EXAMPLE

The embodiments of the present application are to be described by way of examples but the present application is not restricted to the examples.

(Compatibility Evaluation)

The following solvents (Table 1) the solubility parameters of which are known were used and compatibility with the mixture of the compounds (a) and (b), the compound (c), the compound (e), and other components was evaluated. Specifically, 0.5 ml of the mixture of the compounds (a) and (b), the compound (c), the compound (e), and other components was respectively mixed with 0.5 ml of the respective following solvents, they were stirred for one minute with ultrasonic waves, and successively centrifugal separation was applied at 10,000 rpm for 10 minutes. A case where phase separation and cloudiness are not seen in an obtained liquid was defined as good "A" and a case where phase separation or cloudiness is seen in an obtained liquid was defined as poor "C". The results are shown in Table 1.

TABLE 1

| | Solvent Type<br>SP value of solvent | n-hexane<br>7.3 | cyclohexane<br>6.2 | MIBK<br>8.4 | butyl acetate<br>8.5 | toluene<br>8.9 | ethyl acetate<br>9.1 | acetone<br>10 |
|---|---|---|---|---|---|---|---|---|
| (a) + (b) | (a-1) + (b-1) | A | A | A | A | A | C | C |
| | (a-2) + (b-1) | A | A | A | A | A | C | C |
| | (a-1) + (b-2) | A | A | A | A | A | C | C |
| | (a-2) + (b-2) | A | A | A | A | A | C | C |
| (c) | (c-1) | A | A | A | A | A | A | A |
| | (c-2) | A | A | A | A | A | A | A |
| | (c-3) | A | A | A | A | A | A | A |
| | (x-4) | C | C | A | A | A | A | A |
| | (x-5) | C | C | A | A | A | A | A |

TABLE 1-continued

| Solvent Type<br>SP value of solvent | | n-hexane<br>7.3 | cyclohexane<br>6.2 | MIBK<br>8.4 | butyl acetate<br>8.5 | toluene<br>8.9 | ethyl acetate<br>9.1 | acetone<br>10 |
|---|---|---|---|---|---|---|---|---|
| (e) | (e-1) | A | A | A | A | A | A | C |
|     | (e-2) | A | A | A | A | A | A | C |
|     | (e-3) | A | A | A | A | A | A | C |

(a) component
(a-1) oleyl acid phosphate
(a-2) 2-ethylhexyl acid phosphate
(b) component
(b-1) calcium hydroxide
(b-2) basic zinc carbonate
(c) component
(c-1) hexanediol diacrylate
(c-2) bisphenol A diacrylate
(c-3) pentaerythritol triacrylate
(x-4) hydroxyethyl acrylate
(x-5) tetraethylene glycol diacrylate
(e) component
(e-1) mineral base oil: kinematic viscosity = 30 mm$^2$/s (100° C.)
(e-2) synthetic oil: kinematic viscosity = 50 mm$^2$/s (100° C.)
(e-3) liquid paraffin From the results in Table 1, it appears that the mixture of the compounds (a) and (b) is compatible with a solvent with an SP value of 8.2 or lower but is not compatible with a solvent with an SP value of 9.1 or higher. Further, it appears that the compound (e) is compatible with a solvent with an SP value of 8.2 or lower but is not compatible with a solvent with an SP value of 10 or higher. Thus, it appears that the mixture of the compounds (a) and (b), and the compound (e) are compatible with a solvent with an SP value of 8.2 or lower but are not compatible with a solvent with a relatively high SP value. The compound (c) is compatible with a solvent with an SP value of 8.2 or lower. On the other hand, it appears that the components having polar groups in the side chains like (x-4) and (x-5) are not compatible with a solvent with an SP value of 8.2 or lower but are compatible with a solvent with an SP value of 9.1 or higher.

<Preparation of Surface Protection Composition>

Example 1

Calcium hydroxide was added to a methanol solution of oleyl acid phosphate. The mixture was stirred at room temperature, and the methanol was distilled off. Then, hexanediol diacrylate and a photopolymerization initiator were added to the mixture to prepare a surface protection composition according to Example 1. The content ratio of the compounds (in mass %) was as shown in Table 1.

Examples 2 to 14

Surface protection compositions according to Examples 2 to 14 were prepared in the same manner as in Example 1 with the content ratios (in mass %) shown in Table 1. The lubricating base oil is further added to Samples 10 to 14. The composition according to Example 5 contained an amine compound instead of the metal-containing compound. The composition according to Example 8 contained a thermal polymerization initiator instead of a photopolymerization initiator. The composition according to Example 9 contained a thermal polymerization initiator in addition to a photopolymerization initiator.

Example 21

A surface protection composition according to Example 21 was prepared in the same manner as the composition according to Example 10, which contained the lubricating base oil, except that the compound (a) or (b) was not added.

Example 22

A surface protection composition according to Example 22 was prepared in the same manner as the composition according to Example 10, which contained the lubricating base oil, except that the compound (c) was not added.

Examples 23 and 24

Surface protection compositions according to Examples 23 and 24 were prepared in the same manner as the composition according to Example 2, except that (x-4) or (x-5) was added instead of the compound (c).

<Evaluation>

(Compatibility Evaluation of Compositions)

To the prepared surface protection compositions, centrifugal separation was applied at 10,000 rpm for 10 minutes and the compatibility was examined visually. A case where phase separation and cloudiness were not seen in an obtained liquid was defined as good "A" and a case where phase separation or cloudiness was seen in an obtained liquid was defined as poor "C".

(Evaluation of Anticorrosion Performance)

Onto a copper plate of 2 cm×2 cm, 0.05 g of each of the above-prepared surface protection compositions was dropped in a spot shape at room temperature, and then curing of the coating films was performed by irradiating the surface of the coating film with a UV lamp (100 mW/cm$^2$ manufactured by SEN Special Light Source Co., Ltd.) for 20 seconds in the case of the composition containing the photopolymerization initiator, or by leaving the composition in an oven at 120° C. for 30 minutes in the case of the composition containing the thermal polymerization initiator. The obtained test pieces were put into salt splay test for 1,000 hours. The salt splay test was performed according to JIS 22371. From appearance, a case where severe corrosion was seen was evaluated as "C", a case where partial corrosion was seen was evaluated as "B", and a case where corrosion was not seen was evaluated as "A".

TABLE 2

| | | Examples | | | | | | | | | | | | | | Examples | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 21 | 22 | 23 | 24 |
| Compound (a) | a-1 | 60 | — | — | — | — | — | — | — | — | — | — | — | — | — | — | — | — | — |
| | a-2 | — | 60 | — | 60 | 60 | 60 | 60 | 60 | 60 | 10 | 2 | 75 | 75 | 75 | — | 60 | 60 | 60 |
| | a-3 | — | — | 60 | — | — | — | — | — | — | — | — | — | — | — | — | — | — | — |
| Compound (b) | b-1 | 5 | 5 | 5 | — | — | 5 | 5 | 5 | 5 | 17 | 0.4 | 10 | 10 | 10 | — | 5 | 5 | 5 |
| | b-2 | — | — | — | 5 | — | — | — | — | — | — | — | — | — | — | — | — | — | — |
| | b-3 | — | — | — | — | 5 | — | — | — | — | — | — | — | — | — | — | — | — | — |
| Compound (c) | c-1 | 32 | 32 | 32 | 32 | 32 | — | — | 34 | 31 | 60 | 14.6 | 2 | 2 | 2 | 60 | — | — | — |
| | c-2 | — | — | — | — | — | 32 | — | — | — | — | — | — | — | — | — | — | — | — |
| | c-3 | — | — | — | — | — | — | 32 | — | — | — | — | — | — | — | — | — | — | — |
| | x-4 | — | — | — | — | — | — | — | — | — | — | — | — | — | — | — | — | 32 | — |
| | x-5 | — | — | — | — | — | — | — | — | — | — | — | — | — | — | — | — | — | 32 |
| Compound (d) | d-1 | 2 | 2 | 2 | 2 | 2 | 2 | 2 | — | 2 | 2 | 2 | 2 | 2 | 2 | 2 | 2 | 2 | 2 |
| | d-2 | 1 | 1 | 1 | 1 | 1 | 1 | 1 | — | 1 | 1 | 1 | 1 | 1 | 1 | 1 | 1 | 1 | 1 |
| | d-3 | — | — | — | — | — | — | — | 1 | 1 | — | — | — | — | — | — | — | — | — |
| Compound (e) | e-1 | — | — | — | — | — | — | — | — | — | 10 | 80 | 10 | — | — | 37 | 32 | — | — |
| | e-2 | — | — | — | — | — | — | — | — | — | — | — | — | 10 | — | — | — | — | — |
| | e-3 | — | — | — | — | — | — | — | — | — | — | — | — | — | 10 | — | — | — | — |
| P components derived from compound (a) (mass %) | | 4.1 | 7.0 | 4.4 | 7.0 | 7.0 | 7.0 | 7.0 | 7.0 | 7.0 | 1.2 | 0.2 | 8.7 | 8.7 | 8.7 | 0.0 | 7.0 | 7.0 | 1.9 |
| Metal derived from compound (b) (mass %) | | 2.7 | 2.7 | 2.7 | 2.9 | — | 2.7 | 2.7 | 2.7 | 2.7 | 9.2 | 0.2 | 5.4 | 5.4 | 5.4 | — | 2.7 | 2.7 | 2.0 |
| N components derived from compound (b) (mass %) | | — | — | — | — | 0.5 | — | — | — | — | — | — | — | — | — | — | — | — | — |
| ((a) + (b))/ ((a) + (b) + (c)) | | 67% | 67% | 67% | 67% | 67% | 67% | 67% | 67% | 68% | 31% | 14% | 98% | 98% | 98% | 0% | 100% | 67% | 67% |
| Evaluation | Compatability evaluation | A | A | A | A | A | A | A | A | A | A | A | A | A | A | A | A | C | C |
| | Evaluation of anti-corrosion performance | A | A | A | A | A | A | A | A | A | A | A | A | A | A | C | B | C | C |

(a-1) oleyl acid phosphate
(a-2) 2-ethylhexyl acid phosphate
(a-3) stearyl acid phosphate
(b-1) calcium hydroxide
(b-2) basic zinc carbonate
(b-3) octylamine
(e-1) mineral base oil: kinematic viscosity = 30 mm$^2$/s(100° C.)
(e-2) synthetic oil: kinematic viscosity = 50 mm$^2$/s(100° C.)
(e-3) liquid paraffin
(c-1) hexanediol diacrylate
(c-2) bisphenol A diacrylate
(c-3) pentaerythritol triacrylate
(x-4) hydrocyethyl acrylate
(x-5) tetraethylane glycol diacrylate
(d-1) photopolymerization initiator: "IRGACURE 184" (BASF Corporation)
(d-2) photopolymerization initiator: "IRGACURE TPO" (BASF Corporation)
(d-3) thermal polymerization initiator "dicumyl peroxide" (Tokyo Chemical Industry)

Each of the surface protection compositions according to Examples 1 to 14 could be adsorbed on a coated metal surface due to containing of a phosphorous compound (a) and a metal-containing compound or an amine compound as the compound (b). Further, the composition could be liquefied before cured and was excellent in coating properties due to containing of a (meth)acrylate as the compound (c) and a photopolymerization initiator as the compound (d). Further, it appears that, since (meth)acrylates (c-1), (c-2), and (c-3) compatible with a solvent with a solubility parameter of 8.2 or lower were used as the compound (c), a composition containing the mixture of the compounds (a) and (b), and the compound (e) that are also compatible with a solubility parameter of 8.2 or lower did not cause phase separation or cloudiness and a uniform liquid was obtained. A coating film formed from such a uniform composition became a uniform film and hence the corrosion of a copper plate was suppressed in salt splay test as shown in the Examples.

In contrast, where the (meth)acrylate (x-4) or (x-5) that is not compatible with a solvent with a solubility parameter of 8.2 or lower was used instead of the compound (c), a composition containing the mixture of the compounds (a) and (b), and the compound (e) that are compatible with a solubility parameter of 8.2 or lower caused phase separation and cloudiness and a uniform liquid was not obtained. A coating film formed from such a non-uniform composition did not become a uniform film and hence the copper plate corroded in the salt splay test as shown in Examples 23 and 24. Since the surface protection composition according to Example 21 does not contain the compounds (a) and (b), the coating film could not be adsorbed on the metal surface, the surface protection composition was inferior in anticorrosion performance to prevent metal corrosion, and the copper plate corroded in the salt spray test. Since the surface protection composition according to Example 22 did not contain the compound (c), a dense film was not formed, the surface protection composition was inferior in anticorrosion performance to prevent metal corrosion, and the copper plate corroded in the long-term salt slay test.

The embodiments of the present application have been described specifically but the present application is no way restricted to the embodiment described above but can be modified variously within a range not departing from the gist of the present application.

This application claims priority based on Japanese Patent Application No. 2018-222586 filed on Nov. 28, 2018, the entire disclosure of which is incorporated herein by reference.

DESCRIPTION OF REFERENCE NUMERALS

1 Terminal fitted electric wire
2 Electric wire
2a Distal end
3 Electric wire conductor
3a Electrical wire
4 Insulation covering (insulator)
5 Terminal
5a Distal end
5b Side surface
5c Back side
51 Connection part
52 Wire barrel
53 Insulation barrel
54 Electric wire fixing part
6 Electric connection part
7 Cured product

The invention claimed is:

1. A surface protection composition comprising:
(a) a phosphorus compound represented by the following general formula (1) in an amount of 0.1 to 10 mass % in terms of a phosphorus element with respect to a total amount of the composition,

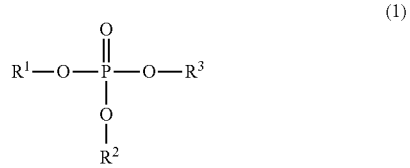

(1)

where $R^1$ represents a hydrogen atom, $R^2$ represents a hydrocarbon group having 4 to 30 carbon atoms, and $R^3$ represents a hydrogen atom or a hydrocarbon group having 4 to 30 carbon atoms;

(b) a metal-containing compound in an amount of 0.1 to 10 mass % in terms of a metal element with respect to the total amount of the composition, or an amine compound in an amount of 0.1 to 5.0 mass % in terms of a nitrogen element with respect to the total amount of the composition;
(c) a (meth)acrylate compatible with a solvent having a solubility parameter of 8.2 or lower in an amount of 1.0 to 70 mass % with respect to the total amount of the composition; and
(d) at least one of a photopolymerization initiator and a thermal polymerization initiator in an amount of 0.1 to 10 mass % with respect to the total amount of the composition,
wherein the surface protection composition is liquid at room temperature.

2. The surface protection composition according to claim 1, wherein the metal element in the compound (b) is at least one selected from the group consisting of alkali metals, alkaline earth metals, aluminum, titanium, and zinc.

3. The surface protection composition according to claim 2, wherein at least one of the hydrocarbon groups having 4 to 30 carbon atoms in the compound (a) has one or more branched chains or one or more carbon-carbon double bonds.

4. The surface protection composition according to claim 3, wherein a mass ratio ((a)+(b)):(c) of a total amount of the compound (a) and the compound (b) to the amount of the compound (c) is within a range of 98:2 to 10:90.

5. The surface protection composition according to claim 4, further comprising (e) lubricating base oil in an amount of 10 to 90 mass % with respect to the total amount of the composition.

6. A terminal-fitted electric wire comprising:
a terminal fitting;
an electric wire; and
an electric connection part between the terminal fitting and the electric wire, covered with a cured product of the surface protection composition according to claim 5.

7. The surface protection composition according to claim 1, wherein at least one of the hydrocarbon groups having 4 to 30 carbon atoms in the compound (a) has one or more branched chains or one or more carbon-carbon double bonds.

8. The surface protection composition according to claim 1, wherein a mass ratio ((a)+(b)):(c) of a total amount of the compound (a) and the compound (b) to the amount of the compound (c) is within a range of 98:2 to 10:90.

9. The surface protection composition according to claim 1, further comprising (e) lubricating base oil in an amount of 10 to 90 mass % with respect to the total amount of the composition.

10. A terminal-fitted electric wire comprising:
a terminal fitting;
an electric wire; and
an electric connection part between the terminal fitting and the electric wire, covered with a cured product of the surface protection composition according to claim 1.

* * * * *